(12) United States Patent
Hori et al.

(10) Patent No.: US 12,269,344 B2
(45) Date of Patent: Apr. 8, 2025

(54) VEHICULAR DISPLAY CONTROL DEVICE, VEHICULAR DISPLAY SYSTEM, VEHICLE, DISPLAY METHOD, AND NON-TRANSITORY COMPUTER-READABLE MEDIUM STORING PROGRAM (71) Applicant: TOYOTA JIDOSHA KABUSHIKI KAISHA, Toyota (JP)

(72) Inventors: Keigo Hori, Toyota (JP); Ryota Hamabe, Nisshin (JP); Takahiro Hirota, Nukata-gun (JP); Yoshinori Murata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/380,313

(22) Filed: Oct. 16, 2023

(65) Prior Publication Data
US 2024/0059148 A1  Feb. 22, 2024

Related U.S. Application Data (63) Continuation of application No. 17/872,539, filed on Jul. 25, 2022, now Pat. No. 11,820,226.

(30) Foreign Application Priority Data

Sep. 17, 2021  (JP) .................. 2021-151952

(51) Int. Cl.
*B60K 35/00* (2024.01)
*B60K 35/10* (2024.01)
(Continued)

(52) U.S. Cl.
CPC ................ *B60K 35/00* (2013.01); *G06F 3/02* (2013.01); *G06F 3/14* (2013.01); *B60K 35/10* (2024.01);
(Continued)

(58) Field of Classification Search
CPC ........ B60K 35/00; B60K 35/10; B60K 35/23; B60K 35/60; B60K 35/81;
(Continued)

(56) References Cited

U.S. PATENT DOCUMENTS

2006/0241818 A1* 10/2006 Kumon .................. B60K 35/00
701/1
2009/0171529 A1* 7/2009 Hayatoma .......... G01C 21/3688
701/36
(Continued)

FOREIGN PATENT DOCUMENTS

JP  2004-21522 A    1/2004
JP  2006-298241 A   11/2006
(Continued)

OTHER PUBLICATIONS

Mar. 2, 2023 U.S. Office Action issued U.S. Appl. No. 17/872,539.
Jul. 14, 2023 Notice of Allowance Issued In U.S. Appl. No. 17/872,539.

*Primary Examiner* — Douglas M Wilson
(74) *Attorney, Agent, or Firm* — Oliff PLC (57) ABSTRACT

A vehicular display control device including: a memory; and a processor coupled to the memory, the processor being configured to: detect when an operation region including plural switches provided to a steering wheel has been operated; and in a case in which operation of the operation region has been detected, display, at a display region set in front of a driving seat, an operation region image corresponding to the operation region and a status image indicating a current status of a function allocated to the switch that is being operated among the plural switches.

12 Claims, 10 Drawing Sheets (51) Int. Cl.
- *B60K 35/23* (2024.01)
- *B60K 35/60* (2024.01)
- *B60K 35/81* (2024.01)
- *B62D 1/04* (2006.01)
- *G06F 3/02* (2006.01)
- *G06F 3/14* (2006.01)

(52) U.S. Cl.
CPC .............. *B60K 35/23* (2024.01); *B60K 35/60* (2024.01); *B60K 35/81* (2024.01); *B60K 2360/1446* (2024.01); *B60K 2360/782* (2024.01); *B62D 1/046* (2013.01); *G09G 2354/00* (2013.01); *G09G 2380/10* (2013.01)

(58) Field of Classification Search
CPC ...... B60K 2360/1446; B60K 2360/782; B60K 2360/162; B60K 2360/55; B60K 35/28; B60K 35/80; G06F 3/02; G06F 3/14; B62D 1/046; G09G 2354/00; G09G 2380/10

See application file for complete search history.

(56) References Cited

U.S. PATENT DOCUMENTS

| | | | | |
|---|---|---|---|---|
| 2013/0285949 | A1* | 10/2013 | Manabe | B60K 35/10 |
| | | | | 345/173 |
| 2014/0281953 | A1* | 9/2014 | Hayashi | A63F 13/42 |
| | | | | 715/773 |
| 2020/0051529 | A1 | 2/2020 | Higashiyama et al. | |
| 2020/0247241 | A1 | 8/2020 | Rafferty et al. | |
| 2021/0138903 | A1 | 5/2021 | Kozono et al. | |
| 2022/0383567 | A1* | 12/2022 | Maekawa | G02B 27/01 |

FOREIGN PATENT DOCUMENTS

| | | |
|---|---|---|
| JP | 2007-025998 A | 2/2007 |
| JP | 2010-165354 A | 7/2010 |
| JP | 2012-094091 A | 5/2012 |
| JP | 2012-252494 A | 12/2012 |
| JP | 2013-121805 A | 6/2013 |
| JP | 2021-075157 A | 5/2021 |
| WO | 2014021063 A1 | 2/2014 |

* cited by examiner

VEHICULAR DISPLAY CONTROL DEVICE, VEHICULAR DISPLAY SYSTEM, VEHICLE, DISPLAY METHOD, AND NON-TRANSITORY COMPUTER-READABLE MEDIUM STORING PROGRAM

CROSS-REFERENCE TO RELATED APPLICATION

This application is a continuation of U.S. application Ser. No. 17/872,539, filed Jul. 25, 2022 and claims priority under 35 USC 119 from Japanese Patent Application No. 2021-151952, filed on Sep. 17, 2021, the disclosure of each of which is incorporated by reference herein.

BACKGROUND

Technical Field

The present disclosure relates to a vehicular display control device, a vehicular display system, a vehicle, a display method, and a non-transitory computer-readable medium storing a program.

Related Art

Japanese Patent Application Laid-Open (JP-A) No. 2021-75157 discloses a configuration in which operation switches are provided on the left and right of a steering wheel. In JP-A No. 2021-75157, images of the operation switches are displayed on a display screen and different functions are allocated to the respective operation switches.

However, in the structure disclosed in JP-A No. 2021-75157, since only the images of the left and right operation switches (operation regions) are displayed on the display screen, the current situation of their corresponding functions is unknown, and so there is room for improvement from the perspective of improving usability.

SUMMARY

The present disclosure provides a vehicular display control device, a vehicular display system, a vehicle, a display method, and a non-transitory computer-readable medium storing a program that enable occupant usability to be improved in configurations capable of displaying an image of an operation region.

A first aspect of the present disclosure is a vehicular display control device including: a memory; and a processor coupled to the memory, the processor being configured to: detect when an operation region including plural switches provided to a steering wheel has been operated; and in a case in which operation of the operation region has been detected, display, at a display region set in front of a driving seat, an operation region image corresponding to the operation region and a status image indicating a current status of a function allocated to the switch that is being operated among the plurality of switches.

In the vehicular display control device according to the first aspect, the operation region image corresponding to the operation region is displayed in the display region set in front of the driving seat in cases in which the operation region provided to the steering wheel has been operated. The status image indicating the current status of the function allocated to the switch that is being operated is also displayed in the display region. This enables the occupant to ascertain the current situation of the function without having to view another display or the like. Note that here, the "switch" is not limited to a mechanical switch which receives input when pressed. For example, the switch may be a mechanism which receives input when a predetermined load or greater is detected, a mechanism which receives input when operation is detected by a sensor such as a static sensor, or the like.

In a second aspect of the present disclosure, in the first aspect, the processor may be configured to change the status image according to a change in status due to operation of the operation region.

In the vehicular display control device according to the second aspect, the occupant may ascertain that the status has changed simply by viewing the status image.

In a third aspect of the present disclosure, in the first aspect or the second aspect, the processor may be configured to perform emphasized display of a portion corresponding to the switch that an occupant is touching out of the plural switches.

In the vehicular display control device according to the third aspect, the occupant can identify the switch that they are touching simply by looking at the portion with the emphasized display. There is accordingly no need for the occupant to lower their gaze in order to visually check the actual switch.

In a fourth aspect of the present disclosure, in any one of the above aspects, the processor may be configured to display a status of at least an item of onboard equipment as the status image.

In the vehicular display control device according to the fourth aspect, the occupant may ascertain the status of the onboard equipment simply by looking at the display region.

In a fifth aspect of the present disclosure, in any one of the above aspects, the processor may be configured to display a status of at least a driving assistance function as the status image.

In the vehicular display control device according to the fifth aspect, the occupant may ascertain the status of the driving assistance function simply by looking at the display region.

In a sixth aspect of the present disclosure, in any one of the above aspects, the processor may be configured to display an animation in which the operation region image is flipped over in cases in which operation of a function switchover switch out of the plural switches has been detected.

In the vehicular display control device according to the sixth aspect, the operation region image displayed in the display region appears to flip over from the perspective of the occupant, thereby enabling the occupant to intuitively realize that the function allocated to the operation region has changed. Moreover, the occupant may intuitively realize that the operation region image may be flipped over again and returned to its original state by operating the function switchover switch again.

In a seventh aspect of the present disclosure, in any one of the above aspects, the processor may be configured to display the operation region image and the status image in the display region set on a windshield glass using a head-up display device installed to a vehicle.

In the vehicular display control device according to the seventh aspect, the operation region image and the status image can be visually checked in a state in which the occupant is directing their gaze toward the windshield glass.

An eighth aspect of the present disclosure is a vehicular display system including the vehicular display control device of any one of the above aspects, and an image display device configured to perform display in the display region.

A ninth aspect of the present disclosure is a vehicle including the vehicular display system of the eighth aspect.

A tenth aspect of the present disclosure is a display method including: detecting when an operation region including plural switches provided to a steering wheel has been operated; and in a case in which operation of the operation region has been detected, displaying, in a display region set in front of a driving seat, an operation region image corresponding to the operation region and a status image indicating a current status of a function allocated to the switch that is being operated among the plural switches.

An eleventh aspect of the present disclosure is a non-transitory computer-readable medium storing a program for causing a computer to execute processing including: detecting when an operation region including plural switches provided to a steering wheel has been operated; and in a case in which operation of the operation region has been detected, displaying, in a display region set in front of a driving seat, an operation region image corresponding to the operation region and a status image indicating a current status of a function allocated to the switch that is being operated among the plural switches.

In the above aspects, the vehicular display control device, the vehicular display system, the vehicle, the display method, and the non-transitory computer-readable medium storing a program according to the present disclosure may enable occupant usability to be improved in configurations capable of displaying an image of an operation region.

BRIEF DESCRIPTION OF THE DRAWINGS

Exemplary embodiments will be described in detail based on the following figures, wherein.

DETAILED DESCRIPTION

Explanation follows regarding a vehicular display system S according to an exemplary embodiment, with reference to the drawings.

Figure 1:
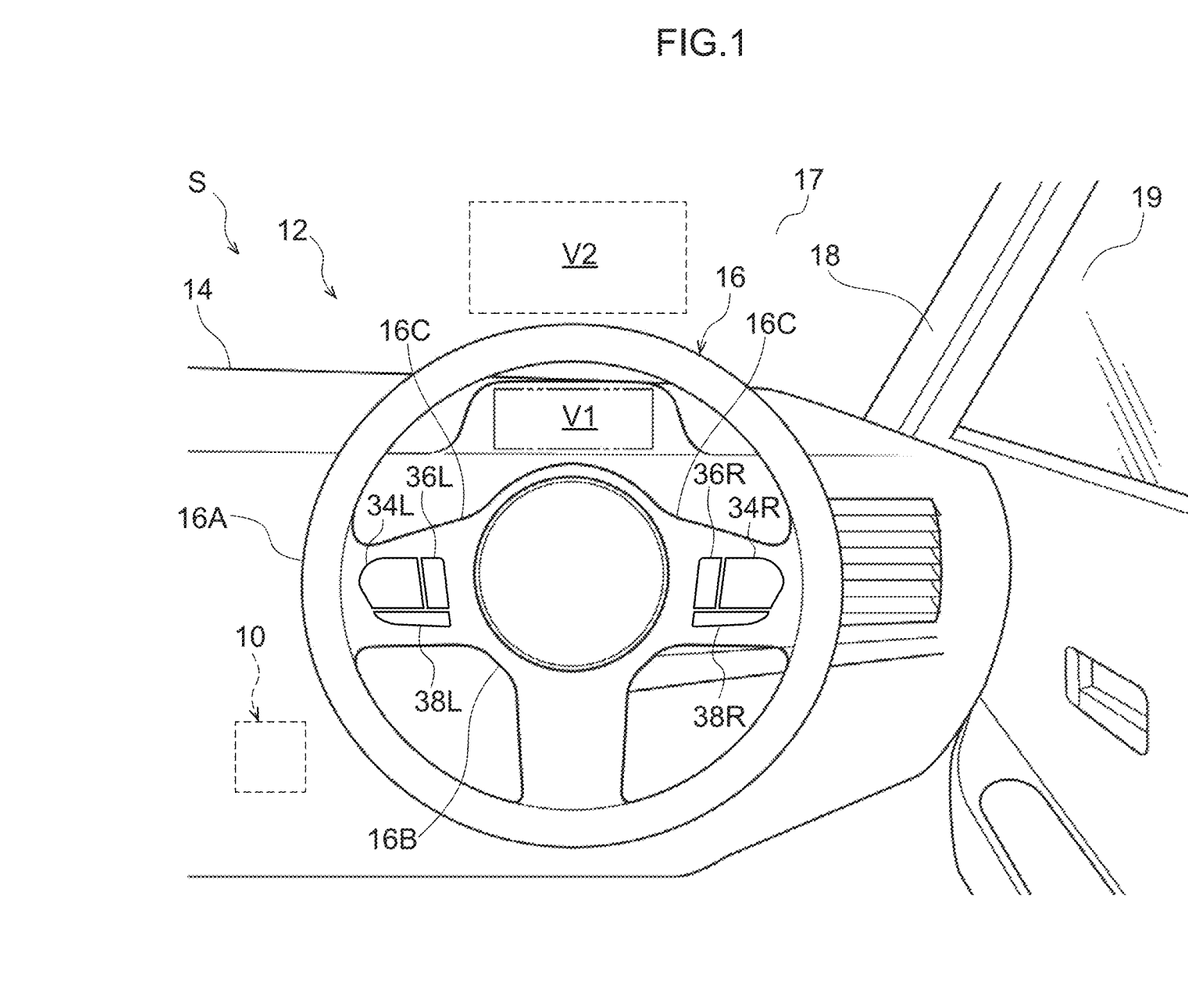
FIG. 1 is a schematic view of a front section inside a vehicle cabin of a vehicle applied with a vehicular display system according to an exemplary embodiment, as viewed from a vehicle rear side.

As illustrated in FIG. 1, an instrument panel 14 is provided to a front section inside a vehicle cabin of a vehicle 12. The instrument panel 14 extends along a vehicle width direction, and a steering wheel 16 is provided on a vehicle right side of the instrument panel 14. Namely, in the present exemplary embodiment as an example, the vehicle is a right-hand drive vehicle in which the steering wheel 16 is provided on the right side, and a driving seat is set on the vehicle right side. A first right-side operation switch 34R, a second right-side operation switch 36R, a right-side function switchover switch 38R, a first left-side operation switch 34L, a second left-side operation switch 36L, and a left-side function switchover switch 38L are provided on the steering wheel 16. Note that the first right-side operation switch 34R, the second right-side operation switch 36R, and the right-side function switchover switch 38R correspond to a right-side operation region of the present disclosure. The first left-side operation switch 34L, the second left-side operation switch 36L, and the left-side function switchover switch 38L correspond to a left-side operation region of the present disclosure. These switches are described later.

A windshield glass 17 is provided at a front end section of the instrument panel 14. The windshield glass 17 extends along a vehicle vertical direction and the vehicle width direction so as to partition between the vehicle cabin interior and vehicle cabin exterior.

A vehicle right side end portion of the windshield glass 17 is fixed to a front pillar 18 on the vehicle right side. The front pillar 18 extends along the vehicle vertical direction. The windshield glass 17 is fixed to a vehicle width direction inside end portion of the front pillar 18. A front end portion of a front side glass 19 is fixed to a vehicle width direction outside end portion of the front pillar 18. Note that a vehicle left side end portion of the windshield glass 17 is fixed to a non-illustrated front pillar on a vehicle left side.

An image display region V1 is provided on the instrument panel 14. The display region V1 is a meter display positioned on the vehicle right side of the instrument panel 14, and displays predetermined information through a first image display device 40 (see FIG. 2). The first image display device 40 is connected to various meter equipment installed to the vehicle 12, and is provided at a position that enters the field of view of a driver in a state in which their gaze is directed toward the vehicle front.

An image display region V2 is provided to the windshield glass 17. The display region V2 is set at a vehicle upper side of the display region V1, and is configured by a projection surface that a second image display device 42 (see FIG. 2) projects onto. Note that the second image display device 42 is a head-up display device provided at a vehicle front side of the instrument panel 14. Images are projected onto the display region V2 of the windshield glass 17 from the second image display device 42 configured by the head-up display device. Namely, the display region V2 configures a part of the windshield glass 17 that serves as the projection surface of the head-up display device.

Note that the steering wheel 16 includes a substantially circular ring-shaped rim 16A. A hub 16B configuring a central portion is provided at an inner circumferential side of the rim 16A. The right side of the rim 16A and the hub 16B are coupled together by a spoke 16C, and the left side of the rim 16A and the hub 16B are similarly coupled together by a spoke 16C. The first right-side operation switch 34R, the second right-side operation switch 36R, and the right-side function switchover switch 38R are provided on the right-side spoke 16C. The first left-side operation switch 34L, the second left-side operation switch 36L, and the left-side function switchover switch 38L are provided on the left-side spoke 16C.

The first right-side operation switch 34R is formed in a substantially rectangular shape, and is disposed at an upper-right portion of the right-side spoke 16C. The first right-side operation switch 34R is configured capable of receiving input on four sides, these being upper, lower, left, and right sides, and functions are allocated to each side.

Note that in the present exemplary embodiment as an example, a non-illustrated static sensor is installed to the first right-side operation switch 34R, such that a touched function is selected when an occupant touches the first right-side operation switch 34R. If the occupant then presses the first right-side operation switch 34R in a state in which the function has been selected, the selected function is executed. Similar static sensors are installed to the second right-side operation switch 36R, the right-side function switchover switch 38R, the first left-side operation switch 34L, the second left-side operation switch 36L, and the left-side function switchover switch 38L.

The second right-side operation switch 36R is formed in a substantially elongated rectangular shape with its length direction along the vertical direction, and is disposed at the left side of the first right-side operation switch 34R. The second right-side operation switch 36R is configured capable of receiving input on two sides, these being upper and lower sides, and functions are allocated to each side.

The right-side function switchover switch 38R is formed in a substantially elongated rectangular shape with its length direction along a left-right direction, and is disposed at the lower side of the first right-side operation switch 34R and the second right-side operation switch 36R. The right-side function switchover switch 38R is a switch for switching functions. Specifically, the functions allocated to the first right-side operation switch 34R are switched by operating the right-side function switchover switch 38R. In the present exemplary embodiment as an example, two functions are allocated to this operation switch, and these functions are switched whenever the right-side function switchover switch 38R is operated.

The first left-side operation switch 34L is formed in a substantially rectangular shape that has left-right symmetry to the first right-side operation switch 34R about a vertical center line of the steering wheel 16, and is disposed at an upper-left portion of the left-side spoke 16C. The first left-side operation switch 34L is configured capable of receiving input on four sides, these being upper, lower, left, and right sides, and functions are allocated to each side.

The second left-side operation switch 36L is formed in a substantially elongated rectangular shape that has left-right symmetry to the second right-side operation switch 36R about a vertical center line of the steering wheel 16, and is disposed at the right side of the first left-side operation switch 34L. The second left-side operation switch 36L is configured capable of receiving input on two sides, these being upper and lower sides, and functions are allocated to each side.

The left-side function switchover switch 38L is formed in a substantially elongated rectangular shape that has left-right symmetry to the right-side function switchover switch 38R about a vertical center line of the steering wheel 16, and is disposed at the lower side of the first left-side operation switch 34L and the second left-side operation switch 36L. The left-side function switchover switch 38L is a switch for switching functions. Specifically, the functions allocated to the first left-side operation switch 34L are switched by operating the left-side function switchover switch 38L.

Note that a vehicular display control device 10 is provided to the vehicle 12. The vehicular display control device 10 of the present exemplary embodiment is for example a display electronic control unit (ECU) that performs various controls.

Hardware Configuration of Vehicular Display System S

Figure 2:
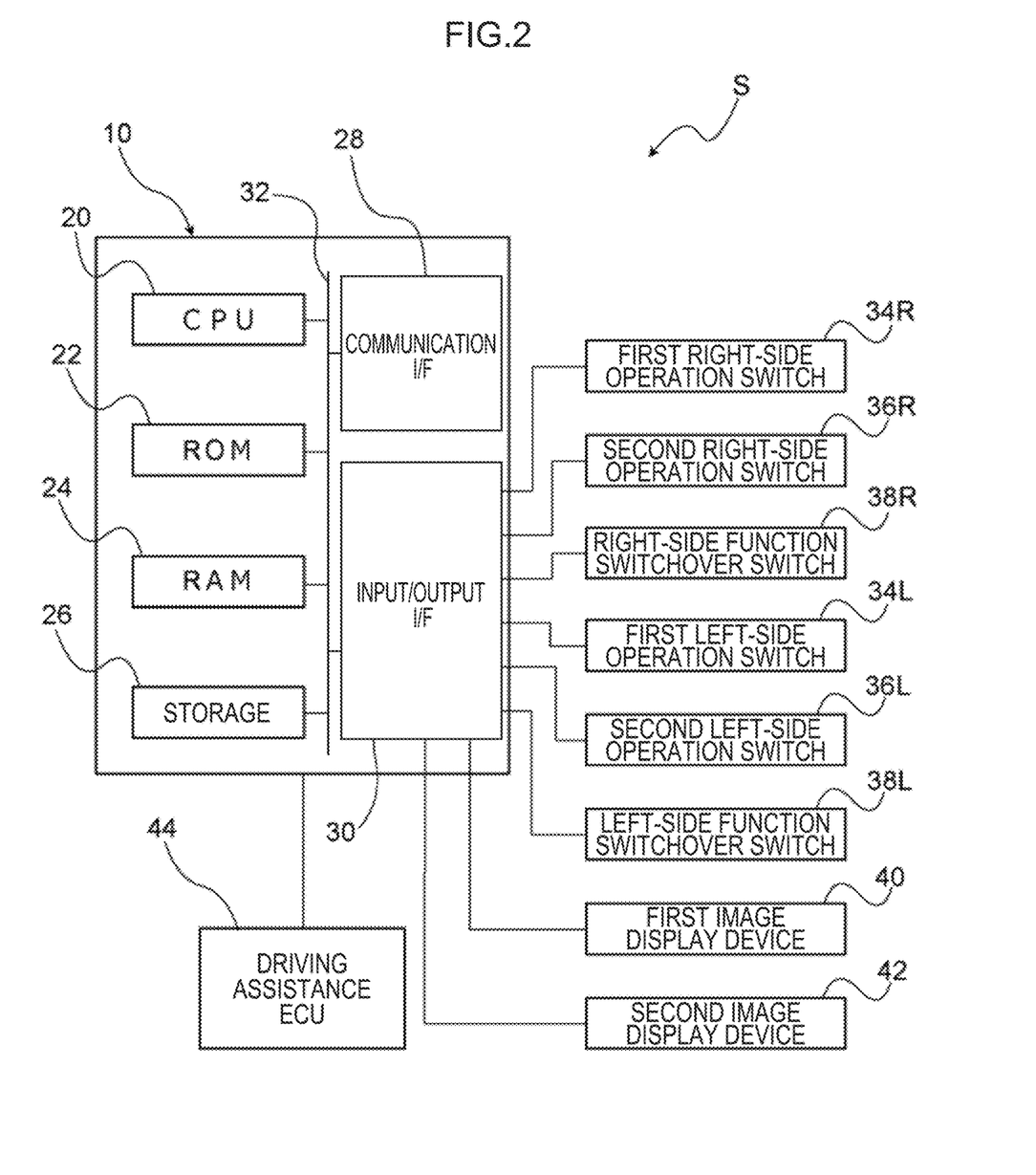
FIG. 2 is a block diagram illustrating a hardware configuration of a vehicular display system according to an exemplary embodiment.

As illustrated in FIG. 2, the vehicular display system S is configured including the vehicular display control device 10.

The vehicular display control device 10 is configured including a central processing unit (CPU; processor) 20, read only memory (ROM) 22, random access memory (RAM) 24, storage 26, a communication interface (communication I/F) 28, and an input/output interface (input/output I/F) 30. The respective configuration elements are connected so as to be capable of communicating with one another through an internal bus 32.

The CPU 20 is a central processing unit that executes various programs and controls respective sections. Namely, the CPU 20 reads a program from the ROM 22 or the storage 26, and executes the program using the RAM 24 as a workspace. The CPU 20 also controls the respective configuration elements and performs various arithmetic processing according to the programs recorded in the ROM 22 or the storage 26.

The ROM 22 holds various programs and various data. The RAM 24 acts as a workspace to temporarily store programs or data. The storage 26 is configured by a hard disk drive (HDD) or a solid state drive (SSD), and is a non-transitory recording medium that holds various programs including an operating system, and various data. In the present exemplary embodiment, programs such as a program for performing display processing are held in the ROM 22 or the storage 26.

The communication I/F 28 is an interface enabling the vehicular display control device 10 to communicate with an external server and other equipment, and a standard such as a Controller Area Network (CAN), Ethernet (registered trademark), Long Term Evolution (LTE), Fiber Distributed Data Interface (FDDI), or Wi-Fi (registered trademark) may be employed therefor.

The first right-side operation switch 34R, the second right-side operation switch 36R, the right-side function switchover switch 38R, the first left-side operation switch 34L, the second left-side operation switch 36L, the left-side function switchover switch 38L, the first image display device 40, and the second image display device 42 are electrically connected to the input/output interface 30.

The first image display device 40 is a device for performing a predetermined display on the display region V1 of the meter display. The second image display device 42 is a device for performing a predetermined display on the display region V2 of the head-up display.

The vehicular display control device 10 is electrically connected to a driving assistance ECU 44. As an example, the driving assistance ECU 44 of the present exemplary embodiment performs control such as active cruise control (ACC) and lane tracing assist (LTA). The driving assistance ECU 44 is thereby configured so as to be capable of acquiring signals from various sensors that detect the surroundings of the vehicle 12.

The vehicular display control device 10 implements various functionality using the above-described hardware resources. Explanation follows regarding functional configuration implemented by the vehicular display control device 10, with reference to FIG. 3.

Figure 3:
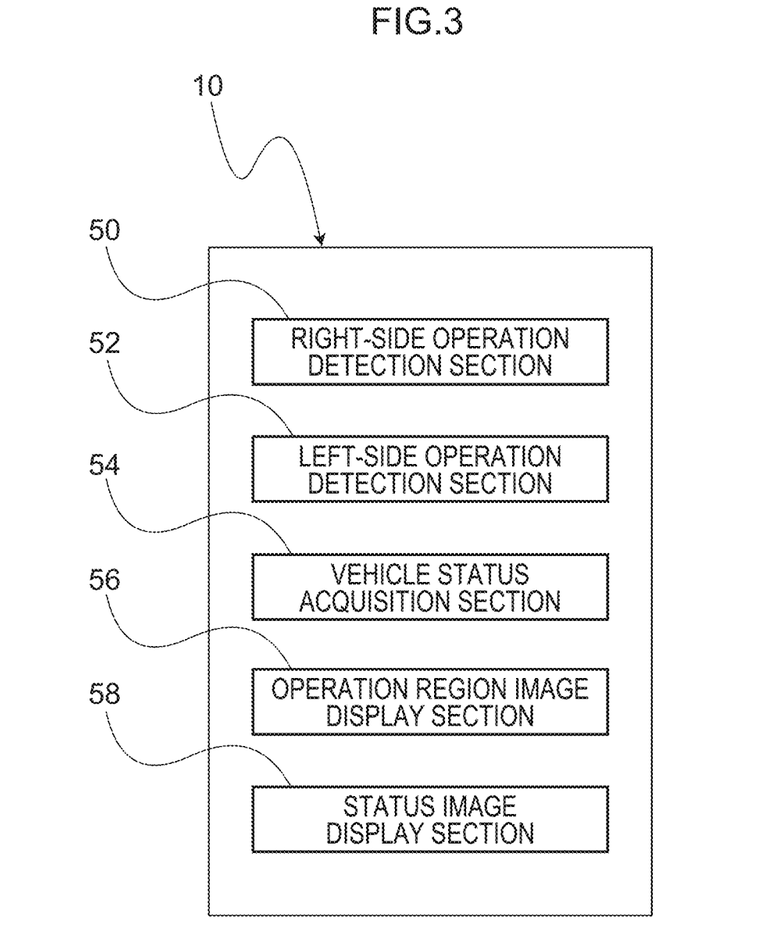
FIG. 3 is a block diagram illustrating a functional configuration of a vehicular display control device according to an exemplary embodiment.

As illustrated in FIG. 3, the vehicular display control device 10 is configured including as functional configuration a right-side operation detection section 50, a left-side operation detection section 52, a vehicle status acquisition section 54, an operation region image display section 56, and a status image display section 58. Note that the respective functional configuration is implemented by the CPU 20 reading and executing a program stored in the ROM 22 or the storage 26.

The right-side operation detection section 50 detects when the right-side operation region has been operated. Specifically, the right-side operation detection section 50 detects when any switch out of the first right-side operation switch 34R, the second right-side operation switch 36R, or the right-side function switchover switch 38R has been operated. Note that here "operation" includes not only an action by the occupant to press a switch, but also includes an action by the occupant to touch a switch. Thus, for example, the right-side operation detection section 50 detects when the occupant has touched the first right-side operation switch 34R using a signal from the corresponding static sensor. The right-side operation detection section 50 also detects when the occupant has pressed the first right-side operation switch 34R using a signal or the like from a corresponding pressure sensor.

The left-side operation detection section 52 detects when the left-side operation region has been operated. Specifically, the left-side operation detection section 52 detects when any switch out of the first left-side operation switch 34L, the second left-side operation switch 36L, or the left-side function switchover switch 38L has been operated. Thus, for example, the left-side operation detection section 52 detects when the occupant has touched the first left-side operation switch 34L using a signal from the corresponding static sensor. The left-side operation detection section 52 also detects when the occupant has pressed the first left-side operation switch 34L using a signal or the like from the corresponding pressure sensor.

The vehicle status acquisition section 54 acquires vehicle statuses based on signals detected by various sensors. For example, the vehicle status acquisition section 54 acquires statuses of onboard equipment installed to the vehicle 12. Here, "onboard equipment" includes an air conditioner, an audio system, and the like. The vehicle status acquisition section 54 also acquires statuses relating to driving assistance functions of the vehicle 12.

In cases in which operation of the right-side operation region has been detected, the operation region image display section 56 displays a right-side operation region image corresponding to the right-side operation region in a right-side area of the display region V2. Similarly, in cases in which operation of the left-side operation region has been detected, the operation region image display section 56 displays a left-side operation region image corresponding to the left-side operation region in a left-side area of the display region V2. The operation region image display section 56 also performs emphasized display of a portion corresponding to the switch that the occupant is touching. Furthermore, in cases in which operation of either the right-side function switchover switch 38R or the left-side function switchover switch 38L has been detected, the operation region image display section 56 displays an animation in which the operation region image is flipped over.

The status image display section 58 displays a current status of the function allocated to the switch that is being operated on the display region V2. The status image display section 58 also changes this status image according a change in the status due to operation of the operation region. Explanation follows regarding functionality of the operation region image display section 56 and the status image display section 58, with reference to FIG. 4 to FIG. 9.

Figure 4:
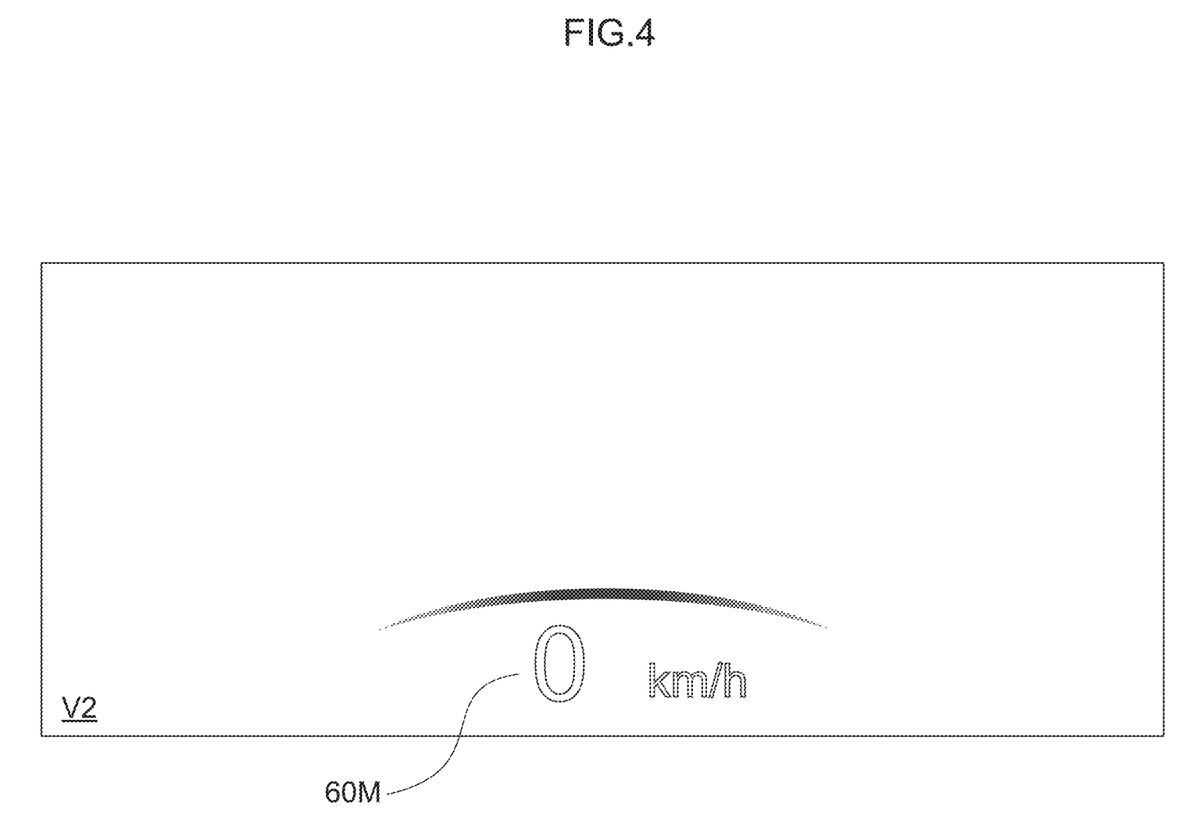
FIG. 4 is a diagram illustrating an example of a display on a display region in an exemplary embodiment, in a state in which right-side operation switches and left-side operation switches have not been touched.

FIG. 4 illustrates a state in which the occupant is not touching any operation switch. In this state, a central image 60M indicating a vehicle status is always displayed in a central area of the display region V2. In the present exemplary embodiment, a current speed of the vehicle 12 is displayed as the central image 60M. A substantially circular arc-shaped indicator is displayed above the speed.

Figure 5:
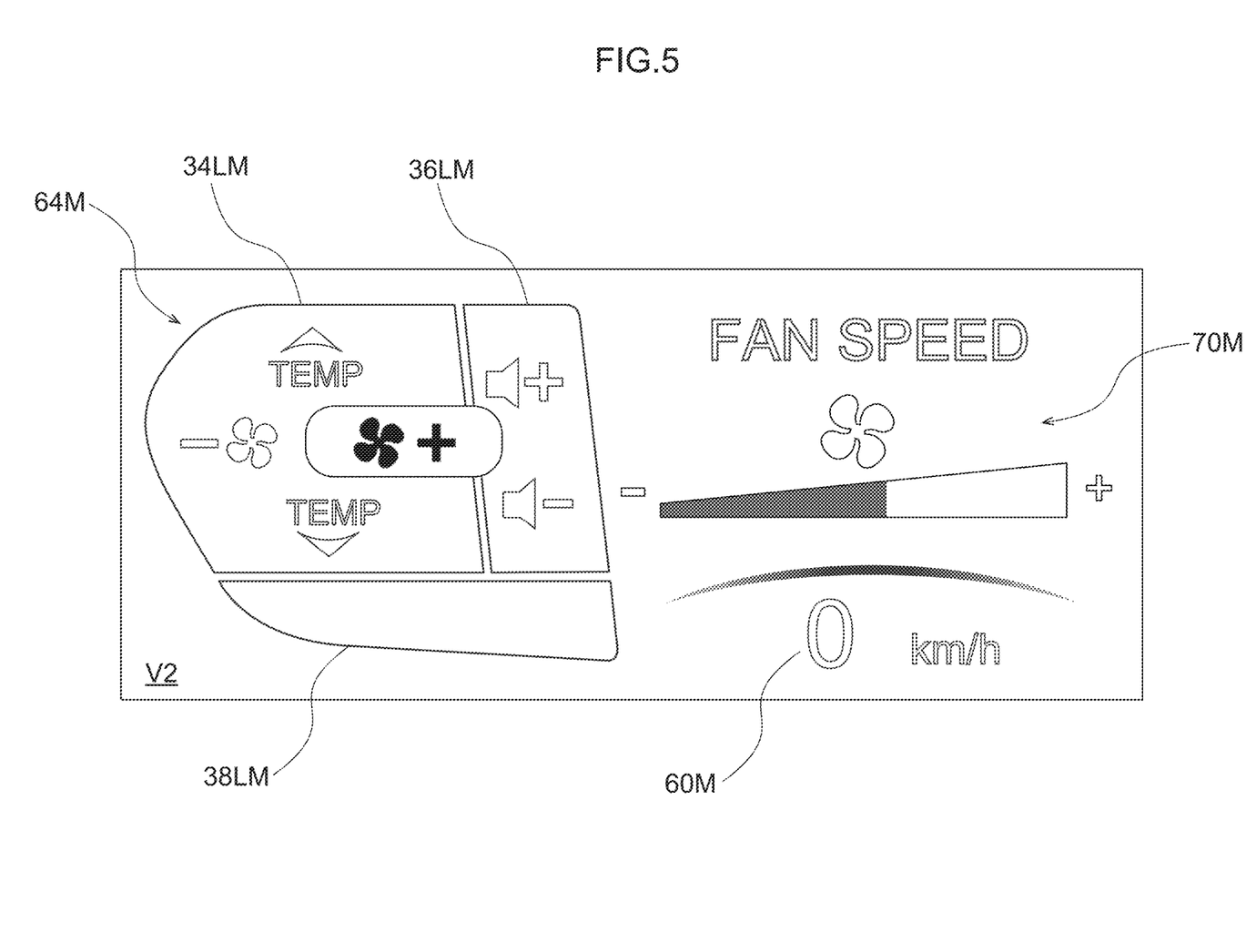
FIG. 5 is an example of a display following on from the state in FIG. 4, illustrating a state in which a left-side operation switch has been touched.

On the other hand, in cases in which the occupant has touched any switch out of the first left-side operation switch 34L, the second left-side operation switch 36L, or the left-side function switchover switch 38L following on from the state in FIG. 4, a transition is made to the state illustrated in FIG. 5. As illustrated in FIG. 5, a left-side operation region image 64M is displayed in a left-side end area of the display region V2 using the functionality of the operation region image display section 56. Note that the operation region image display section 56 moves the central image 60M toward the right side from its position in FIG. 4, and displays the left-side operation region image 64M further toward the left side than the central image 60M.

The left-side operation region image 64M is configured including a first left-side operation switch image 34LM with a shape representing the first left-side operation switch 34L, a second left-side operation switch image 36LM with a shape representing the second left-side operation switch 36L, and a left-side function switchover switch image 38LM with a shape representing the left-side function switchover switch 38L. FIG. 5 illustrates a state in which the occupant is touching a right end of the first left-side operation switch 34L.

An icon for reducing an airflow of the air conditioner is displayed at a left portion of the first left-side operation switch image 34LM. When this icon is selected, the airflow is reduced by a predetermined amount. An icon for increasing the air conditioner airflow is displayed at a right portion of the first left-side operation switch image 34LM. When this icon is selected, the airflow is increased by a predetermined amount. Note that in the state in FIG. 5, the occupant is touching a right portion of the first left-side operation switch 34L, and so the icon at the right portion of the first left-side operation switch image 34LM is displayed left-right reversed and is also displayed emphasized by being surrounded by an elongated circle.

An icon for raising a set temperature of the air conditioner is displayed at an upper portion of the first left-side operation switch image 34LM. When this icon is selected, the set temperature is raised by a predetermined amount. An icon for lowering the set temperature of the air conditioner is displayed at a lower portion of the first left-side operation switch image 34LM. When this icon is selected, the set temperature is lowered by a predetermined amount.

A volume up icon is displayed at an upper portion of the second left-side operation switch image 36LM. When this icon is selected, the volume of music or the like being played inside the vehicle cabin is increased by a predetermined amount. A volume down icon is displayed at a lower portion of the second left-side operation switch image 36LM. When this icon is selected, the volume is reduced by a predetermined amount.

A function switchover icon is displayed in the left-side function switchover switch image 38LM. When this icon is selected, the functions allocated to the first left-side operation switch 34L are switched.

A right-side status image 70M is displayed on the right side of the left-side operation region image 64M using the functionality of the status image display section 58. Text indicating that this is an air conditioner airflow setting screen is displayed at an upper portion of the right-side status image 70M. An icon representing a fan is displayed below the text.

A substantially bar-shaped icon that extends along the left-right direction is displayed at a lower portion of the right-side status image 70M. The icon has a tapered shape that becomes narrower in width on progression from the right side toward the left side. Only the left half of the bar-shaped icon is displayed in color, thereby enabling the occupant to intuitively ascertain the current airflow of the air conditioner. A minus sign is displayed on the left side of the bar-shaped icon, and a plus sign is displayed on the right side of the bar-shaped icon.

If the occupant presses the right portion of the first left-side operation switch 34L following on from the state in FIG. 5, an increase in the air conditioner airflow is executed. When this occurs, the right-side status image 70M is changed in the manner illustrated in FIG. 6 using the functionality of the status image display section 58.

Figure 6:
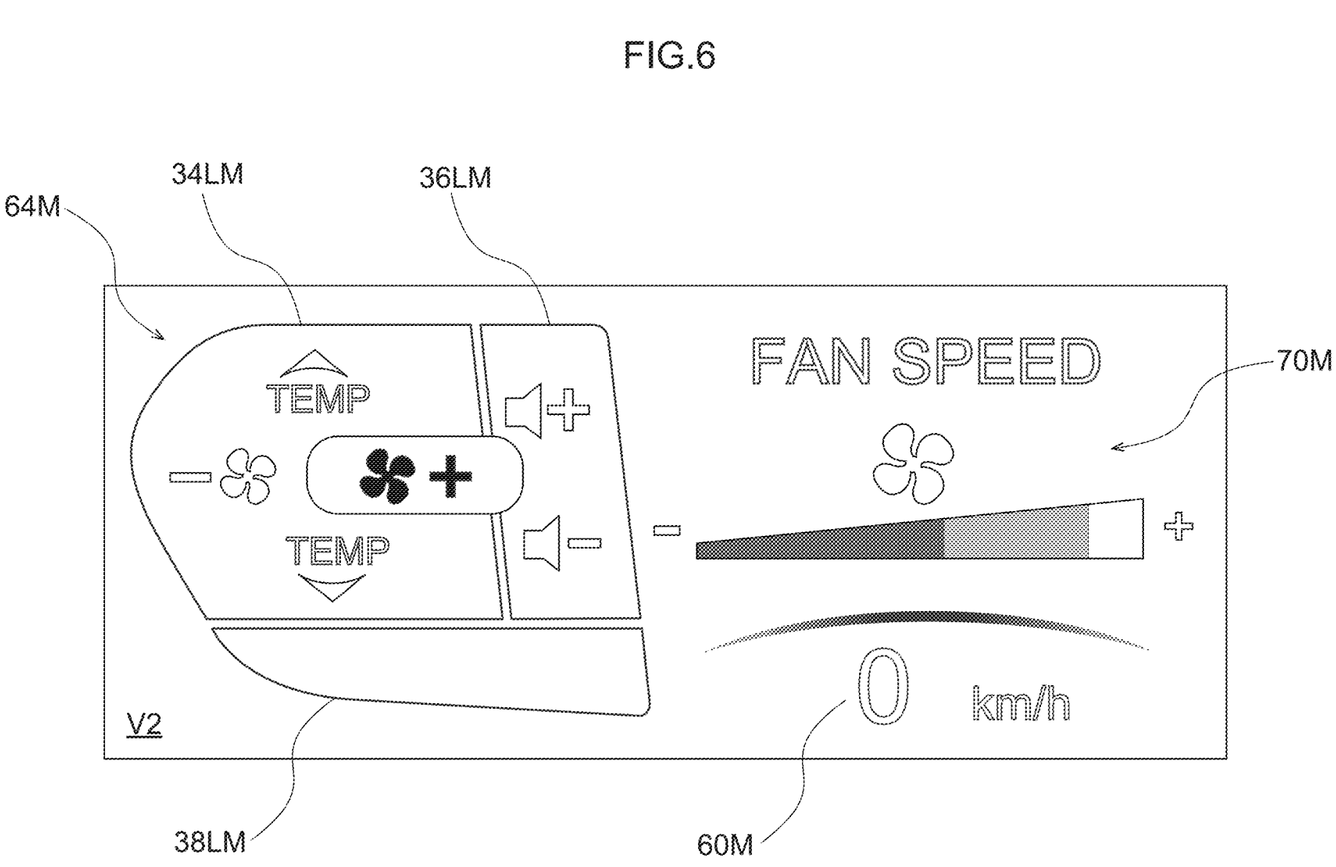
FIG. 6 is an example of a display following on from the state in FIG. 5, illustrating a state directly after the left-side operation switch has been operated.

As illustrated in FIG. 6, a colored region of the bar-shaped icon in the right-side status image 70M has increased compared to FIG. 5. Specifically, a portion of the bar-shaped icon further toward the right side than a halfway point is colored, thereby enabling the occupant to visually confirm that the air conditioner airflow has increased. Note that although the portion indicating the increased airflow is depicted in a different color for ease of explanation in FIG. 6, there is no limitation thereto, and the entire colored region may be displayed in the same color.

Figure 7:
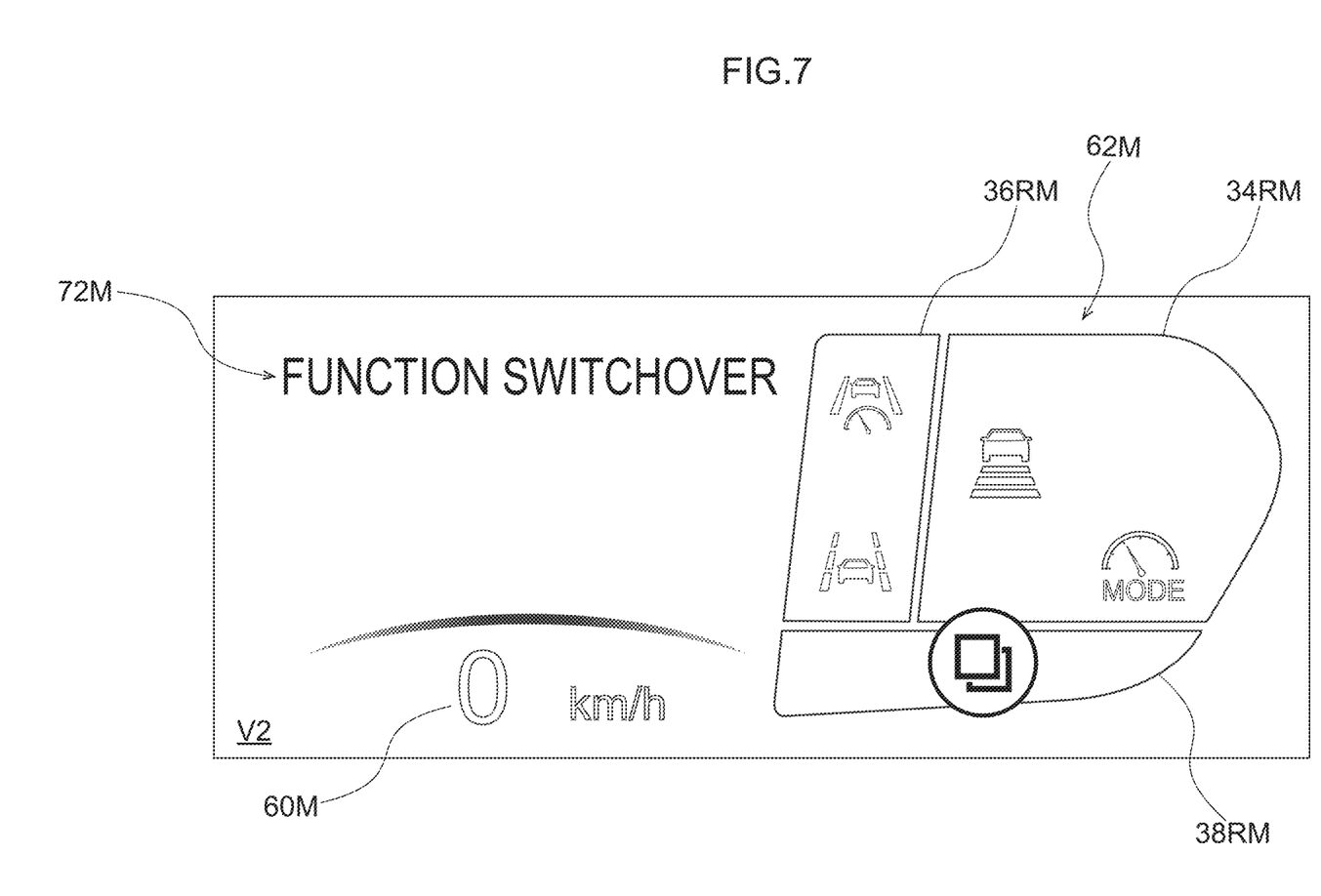
FIG. 7 is an example of a display following on from the state in FIG. 4, illustrating a state in which a right-side operation switch has been touched.

In cases in which the occupant has touched any switch out of the first right-side operation switch 34R, the second right-side operation switch 36R, or the right-side function switchover switch 38R following on from the state in FIG. 4, a transition is made to the state illustrated in FIG. 7. As illustrated in FIG. 7, a right-side operation region image 62M is displayed in a right-side end area of the display region V2 using the functionality of the operation region image display section 56. Note that the operation region image display section 56 moves the central image 60M toward the left side from its position in FIG. 4, and displays the right-side operation region image 62M further toward the right side than the central image 60M.

The right-side operation region image 62M is configured including a first right-side operation switch image 34RM with a shape representing the first right-side operation switch 34R, a second right-side operation switch image 36RM with a shape representing the second right-side operation switch 36R, and a right-side function switchover switch image 38RM with a shape representing the right-side function switchover switch 38R. FIG. 7 illustrates a state in which the occupant is touching the right-side function switchover switch 38R.

As an example, icons are not displayed at an upper portion and a right-side portion of the first right-side operation switch image 34RM. Namely, the design is such that no icon is displayed at a location where no function has been allocated.

An icon relating to setting inter-vehicle distance is displayed at a left-side portion of the first right-side operation switch image 34RM. When this icon is selected, the inter-vehicle distance can be set. Namely, an inter-vehicle distance setting function has been allocated to the left-side portion of the first right-side operation switch 34R.

An icon relating to switching travel modes is displayed at a lower portion of the first right-side operation switch image 34RM. When this icon is selected, the travel mode can be switched. Namely, a travel mode switchover function has been allocated to the lower portion of the first right-side operation switch 34R.

An icon relating to switching a radar cruising mode ON and OFF is displayed at an upper portion of the second right-side operation switch image 36RM. When this icon is selected, the radar cruising mode can be switched ON and OFF. An icon relating to switching LTA ON and OFF is displayed at a lower portion of the second right-side operation switch image 36RM. When this icon is selected, LTA can be switched ON and OFF. Information relating to driving assistance is displayed in the right-side operation region image 62M in this manner.

A function switchover icon is displayed in the right-side function switchover switch image 38RM. When this icon is selected, the functions allocated to the first right-side operation switch 34R are switched.

A left-side status image 72M is displayed on the left side of the right-side operation region image 62M using the functionality of the status image display section 58. Text indicating that a function switchover button is selected is displayed in the left-side status image 72M.

In cases in which the occupant presses the right-side function switchover switch 38R following on from the state in FIG. 7, the operation region image display section 56 displays an animation in which the first right-side operation switch image 34RM in the right-side operation region image 62M is flipped over.

Figure 8:
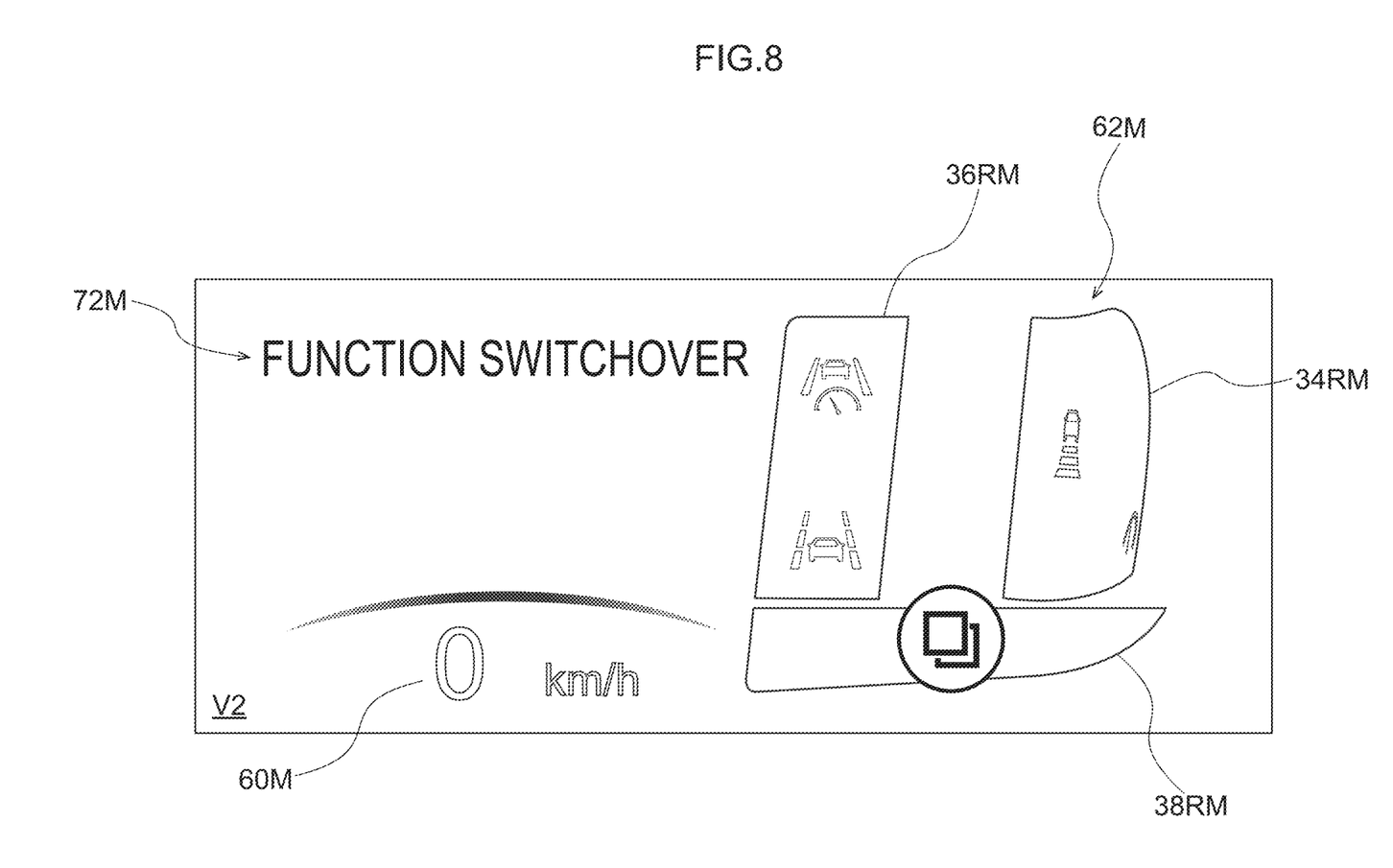
FIG. 8 is an example of a display following on from the state in FIG. 7, illustrating a state directly after the right-side operation switch has been operated.

FIG. 8 illustrates a state in which the animation is partway through being flipped over. As illustrated in FIG. 8, the second right-side operation switch image 36RM and the right-side function switchover switch image 38RM do not change, and only the first right-side operation switch image 34RM is flipped over.

Figure 9:
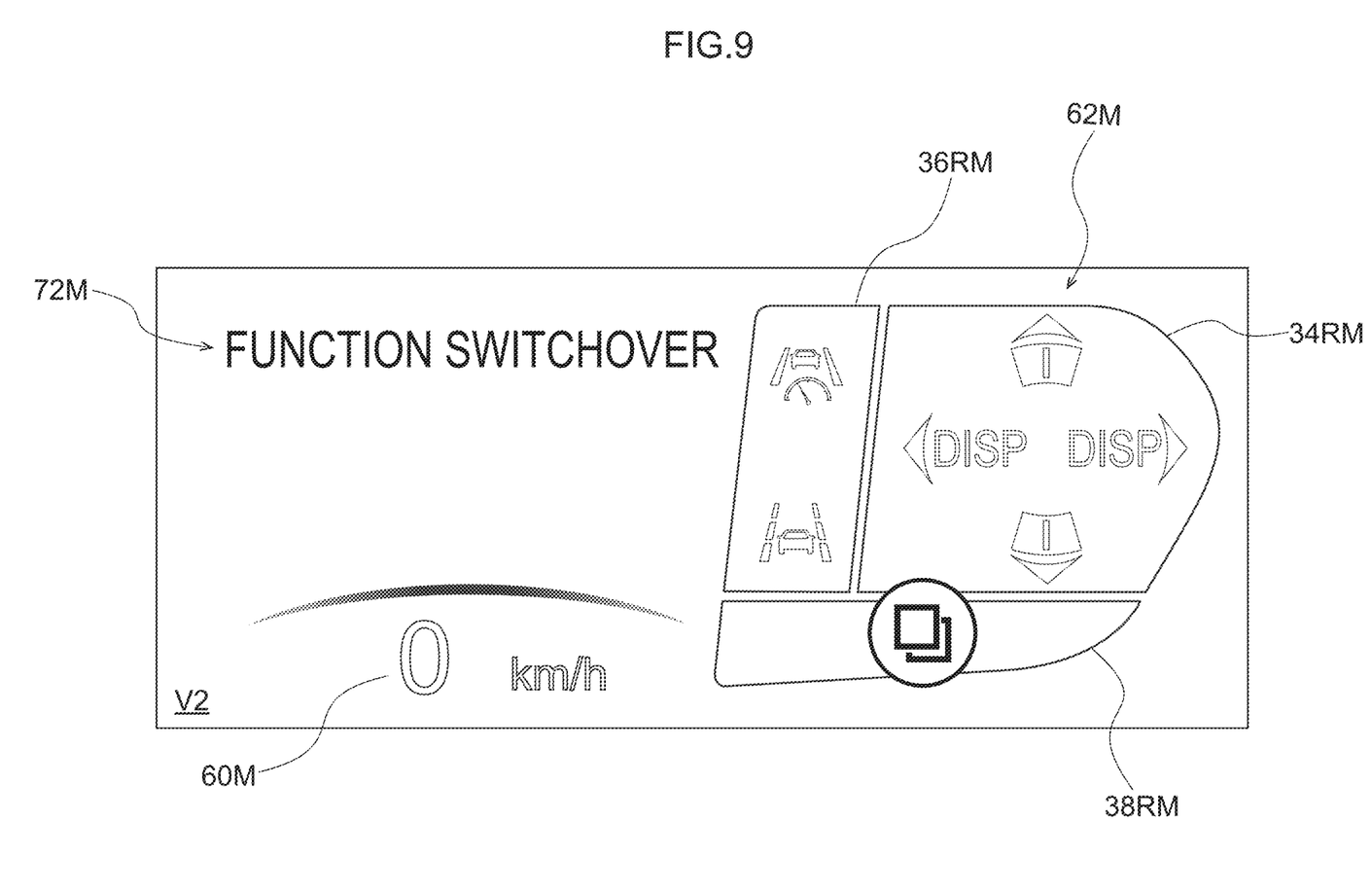
FIG. 9 is an example of a display following on from the state in FIG. 7, illustrating a state in which an image has been flipped over.

As illustrated in FIG. 9, when the first right-side operation switch image 34RM has been flipped over, the functions allocated to the first right-side operation switch 34R have changed. Namely, the icons displayed at the upper, lower, left, and right sides of the first right-side operation switch image 34RM have changed.

Next, explanation follows regarding operation of the present exemplary embodiment.

Figure 10:
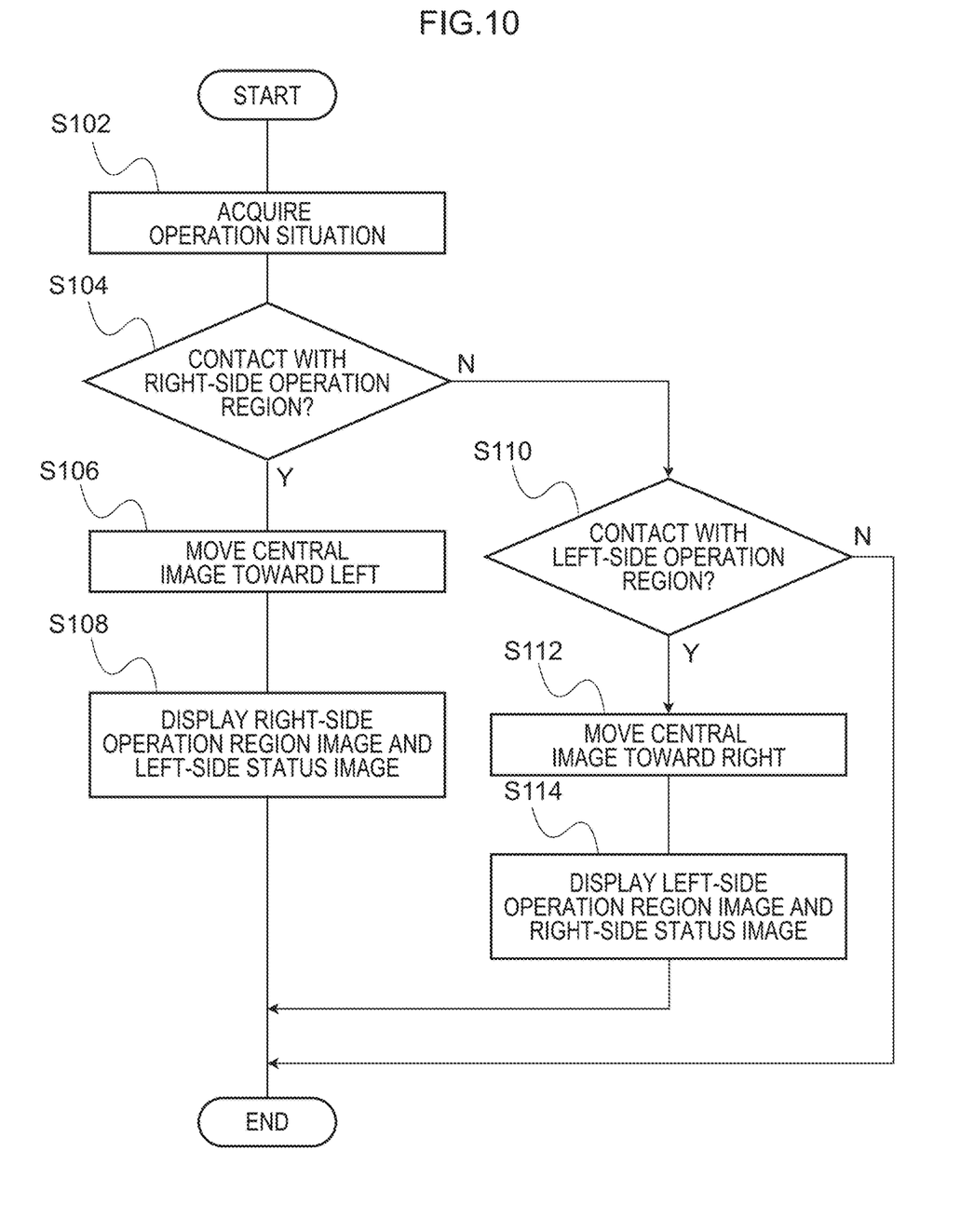
FIG. 10 is a flowchart illustrating an example of a flow of display processing of an exemplary embodiment.

Explanation follows regarding an example of display processing by the vehicular display control device 10, with reference to the flowchart illustrated in FIG. 10. The display processing is executed by the CPU 20 reading a display program from the ROM 22 or the storage 26, and deploying and executing the display program in the RAM 24.

At step S102, the CPU 20 acquires an operation situation of each of the operation regions. Specifically, the CPU 20 acquires information from the non-illustrated static sensors that are respectively installed to the first right-side operation switch 34R, the second right-side operation switch 36R, the right-side function switchover switch 38R, the first left-side operation switch 34L, the second left-side operation switch 36L, and the left-side function switchover switch 38L.

At step S104, the CPU 20 determines whether or not the hand of the occupant is contacting the right-side operation region. Specifically, in cases in which the CPU 20 has detected using the functionality of the right-side operation detection section 50 that the hand of the occupant is contacting any switch out of the first right-side operation switch 34R, the second right-side operation switch 36R, or the right-side function switchover switch 38R, step S104 is affirmative and processing transitions to step S106. On the other hand, in cases in which the CPU 20 has not detected using the functionality of the right-side operation detection section 50 that the hand of the occupant has contacted any switch out of the first right-side operation switch 34R, the second right-side operation switch 36R, or the right-side function switchover switch 38R, step S104 is negative and processing transitions to step S110. The processing of step S110 onward is described later.

At step S106, the CPU 20 uses the functionality of the operation region image display section 56 to move the central image 60M toward the left side. At step S108, the CPU 20 displays the right-side operation region image 62M and the left-side status image 72M in the display region V2 (see FIG. 7).

On the other hand, in cases in which the hand of the occupant has not contacted the right-side operation region, at step S110, the CPU 20 determines whether or not the hand of the occupant has contacted the left-side operation region. Specifically, in cases in which the CPU 20 has detected using the functionality of the left-side operation detection section 52 that the hand of the occupant is touching any switch out of the first left-side operation switch 34L, the second left-side operation switch 36L, or the left-side function switchover switch 38L, step S110 is affirmative and processing transitions to step S112. On the other hand, in cases in which the CPU 20 has not detected using the functionality of the left-side operation detection section 52 that the hand of the occupant has contacted any switch out of the first left-side operation switch 34L, the second left-side operation switch 36L, or the left-side function switchover switch 38L, step S110 is negative and the display processing is ended.

At step S112, the CPU 20 uses the functionality of the operation region image display section 56 to move the central image 60M toward the right side. At step S114, the CPU 20 displays the left-side operation region image 64M and the right-side status image 70M in the display region V2 (see FIG. 5).

As described above, in the vehicular display control device 10 according to the present exemplary embodiment, in cases in which an operation region provided to the steering wheel 16 has been operated, an operation region image corresponding to this operation region is displayed in the display region V2 set in front of the driving seat. A status image indicating the current status of the function allocated to the switch that is being operated is also displayed in the display region V2. This enables the occupant to ascertain the current situation of the function without having to view another display or the like.

In particular, since the display region V2 is set on the windshield glass 17 in the present exemplary embodiment, the operation region image and the status image can be visually checked in a state in which the occupant is directing their gaze toward the windshield glass 17.

Moreover, in the present exemplary embodiment, the occupant can ascertain that a status has changed simply by viewing the corresponding status image. Furthermore, the occupant can identify the switch that they are touching simply by looking at the portion with the emphasized display. There is accordingly no need for the occupant to lower their gaze in order to visually check the actual switch.

Furthermore, in the present exemplary embodiment, the occupant can ascertain the status of the onboard equipment simply by looking at the right-side status image 70M displayed in the display region V2. Similarly, the occupant can ascertain the status of the driving assistance function simply by looking at the left-side status image 72M displayed in the display region V2.

Moreover, in the present exemplary embodiment, when the functions of the first right-side operation switch image 34RM are switched as illustrated in FIG. 7 to FIG. 9, the first right-side operation switch image 34RM displayed in the display region V2 appears to flip over from the perspective of the occupant, thereby enabling the occupant to intuitively realize that the functions allocated to the first right-side operation switch image 34RM have changed. Moreover, the occupant can intuitively realize that the first right-side operation switch image 34RM can be flipped over again and returned to its original state by operating the right-side function switchover switch 38R again.

Although the vehicular display system S and the vehicular display control device 10 according to the present exemplary embodiment have been described above, obviously various modifications may be implemented within a range not departing from the spirit of the present disclosure. For example, although an example of display in the display region V2 has been described in the above exemplary embodiment, there is no limitation thereto, and the corresponding right-side operation region image or left-side operation region image may be displayed in the display region V1.

Moreover, although only the first right-side operation switch image 34RM is displayed as an animation that is flipped over as illustrated in FIG. 7 to FIG. 9 in the above exemplary embodiment, there is no limitation thereto, and the second right-side operation switch image 36RM may be configured so as to be flipped over in a similar manner. In such cases, the functions allocated to the second right-side operation switch image 36RM may be changed. Furthermore, the left-side operation region image 64M may also be displayed as an animation that is flipped over in a similar manner.

Furthermore, although the icon at the right-side portion of the first left-side operation switch image 34LM is surrounded by an elongated circle so as to emphasize the display as illustrated in FIG. 5 in the present exemplary embodiment, the display of the right-side status image 70M may also be changed in addition to this. For example, configuration may be such that the occupant is made aware that the airflow increase button has been selected by displaying the plus sign in the right-side status image 70M in a larger size.

Furthermore, there is no particular limitation to the number and shapes of the respective operation switches and respective function switchover switches, which may be modified as appropriate.

Although an example of display in the display region V2 has been described in the above exemplary embodiment, there is no limitation thereto, and the corresponding right-side image or left-side image may be displayed in the display region V1.

What is claimed is:

1. A vehicular display control device, comprising:
a memory; and
a processor coupled to the memory, the processor being configured to:
detect an operation to an operation section reachable by an occupant seated at a driver's seat of a vehicle;
control a display to display a vehicle speed indicating a current speed of the vehicle;
control the display to display an image adjacent to the vehicle speed, in response to detecting the operation, the image including a part of a frame corresponding to the operation section and an icon in the frame; and
control the display such that the frame is displayed without the icon in response to
failing to satisfy a predetermined requirement, and detection of the operation.

2. The vehicular display control device of claim 1, wherein the predetermined requirement includes a case in which a predetermined function is allocated at the operation section.

3. The vehicular display control device of claim 1, wherein the processor is configured to control the display to display the part of the frame with an animation, in a case in which operation of the operation section has been detected.

4. The vehicular display control device of claim 1, wherein the frame represents the operation section.

5. The vehicular display control device of claim 1, wherein the operation section includes a plurality of operation regions, and each of the plurality of operation regions is allocated to each of a plurality of corresponding onboard units.

6. The vehicular display control device of claim 5, wherein the icon includes an image indicating a function of the onboard unit, and wherein the processor is configured to control the display to display a plurality of icons such that an arrangement of the plurality of icons corresponds to an arrangement of the plurality of operation regions.

7. The vehicular display control device of claim 1, wherein the processor is configured to change the image according to a change in status due to operation of the operation section.

8. The vehicular display control device of claim 1, wherein the processor is configured to control the display to display, in an emphasized manner, a portion of the image, corresponding to the operation section, which the occupant is touching.

9. The vehicular display control device of claim 1, wherein the processor is configured to display a status of at least a driving assistance function as the image.

10. The vehicular display control device of claim 1, wherein the display is a head-up display device installed at the vehicle, which displays the image in a display region set at a windshield glass.

11. A vehicular display system comprising:
the vehicular display control device of claim 1; and
the display.

12. A vehicle comprising the vehicular display system of claim 11.

* * * * *